United States Patent
Brewer et al.

(10) Patent No.: US 10,634,174 B2
(45) Date of Patent: Apr. 28, 2020

(54) HYDRAULIC VALVE

(71) Applicant: Claverham Limited, Solihull (GB)

(72) Inventors: Paul Brewer, Bristol (GB); Reg Raval, Bristol (GB)

(73) Assignee: CLAVERHAM LIMITED, Bristol, Avon (GB)

( * ) Notice: Subject to any disclaimer, the term of this patent is extended or adjusted under 35 U.S.C. 154(b) by 0 days.

(21) Appl. No.: 15/964,160

(22) Filed: Apr. 27, 2018

(65) Prior Publication Data

US 2018/0372134 A1    Dec. 27, 2018

(30) Foreign Application Priority Data

Jun. 22, 2017    (EP) .................................... 17275089

(51) Int. Cl.
*F16K 31/00*    (2006.01)
*F15B 21/045*    (2019.01)
(Continued)

(52) U.S. Cl.
CPC ........ *F15B 21/045* (2013.01); *F15B 13/0402* (2013.01); *F15B 13/12* (2013.01);
(Continued)

(58) Field of Classification Search
CPC .... F15B 21/045; F15B 13/0402; F15B 13/12; F15B 18/00; F15B 11/22; F16K 27/041;
(Continued)

(56) References Cited

U.S. PATENT DOCUMENTS

| 2,920,650 A | 1/1960 | Moog, Jr. |
| 3,331,393 A | 7/1967 | Ernyei |

(Continued)

FOREIGN PATENT DOCUMENTS

| DE | 3926846 A1 | 2/1991 |
| DE | 19963499 A1 | 2/2001 |

(Continued)

OTHER PUBLICATIONS

Machine translation of DE3926846A1, using Espacenet [retrieved from www.espacenet.com], [retrieved on Apr. 29, 2019] (Year: 2019).*

(Continued)

*Primary Examiner* — Craig J Price
(74) *Attorney, Agent, or Firm* — Cantor Colburn LLP

(57) ABSTRACT

A hydraulic spool valve assembly comprising a housing defining a bore having a longitudinal axis (L), a hydraulic spool valve, a sleeve disposed within the bore and a temperature compensation device disposed between the sleeve and the housing. The hydraulic spool valve having a first end for connection to a drive arm, and an opposing second end disposed within the bore. The sleeve disposed between the hydraulic spool valve and the housing. The temperature compensation device configured to expand in a first longitudinal direction in response to a temperature increase, to oppose movement of the sleeve in an opposing second longitudinal direction caused by the temperature increase.

10 Claims, 3 Drawing Sheets

(51) Int. Cl.
    *F15B 18/00* (2006.01)
    *F16K 27/04* (2006.01)
    *F16K 11/07* (2006.01)
    *F15B 13/04* (2006.01)
    *F15B 13/12* (2006.01)
    *F03G 7/06* (2006.01)

(52) U.S. Cl.
    CPC .............. *F15B 18/00* (2013.01); *F16K 11/07* (2013.01); *F16K 11/0708* (2013.01); *F16K 27/041* (2013.01); *F03G 7/065* (2013.01); *F16K 31/002* (2013.01); *Y10T 137/0318* (2015.04); *Y10T 137/0402* (2015.04)

(58) Field of Classification Search
    CPC .... F16K 31/002; F16K 11/07; F16K 11/0708; Y10T 137/86582; Y10T 137/0318; Y10T 137/0402; F03G 7/065
    USPC .................. 251/368; 137/625.6; 60/527–529
    See application file for complete search history.

(56) References Cited

U.S. PATENT DOCUMENTS

| | | | |
|---|---|---|---|
| 4,822,076 A * | 4/1989 | Padilla | F16L 37/48 285/404 |
| 5,316,044 A | 5/1994 | Szentes et al. | |
| 5,785,246 A * | 7/1998 | King | B05B 1/3033 239/101 |
| 6,520,478 B1 * | 2/2003 | Hope | F16K 11/0704 251/297 |
| 7,631,591 B2 | 12/2009 | Shelbourn et al. | |
| 8,707,694 B2 * | 4/2014 | Olson | F03G 7/065 60/527 |
| 2005/0070848 A1 * | 3/2005 | Kim | A61M 5/2053 604/140 |

FOREIGN PATENT DOCUMENTS

| | | |
|---|---|---|
| EP | 3133296 A1 | 2/2017 |
| JP | S5253194 A | 4/1977 |

OTHER PUBLICATIONS

Extended European Search Report for International Application No. 17275089.5 dated Dec. 15, 2017, 8 pages.

* cited by examiner

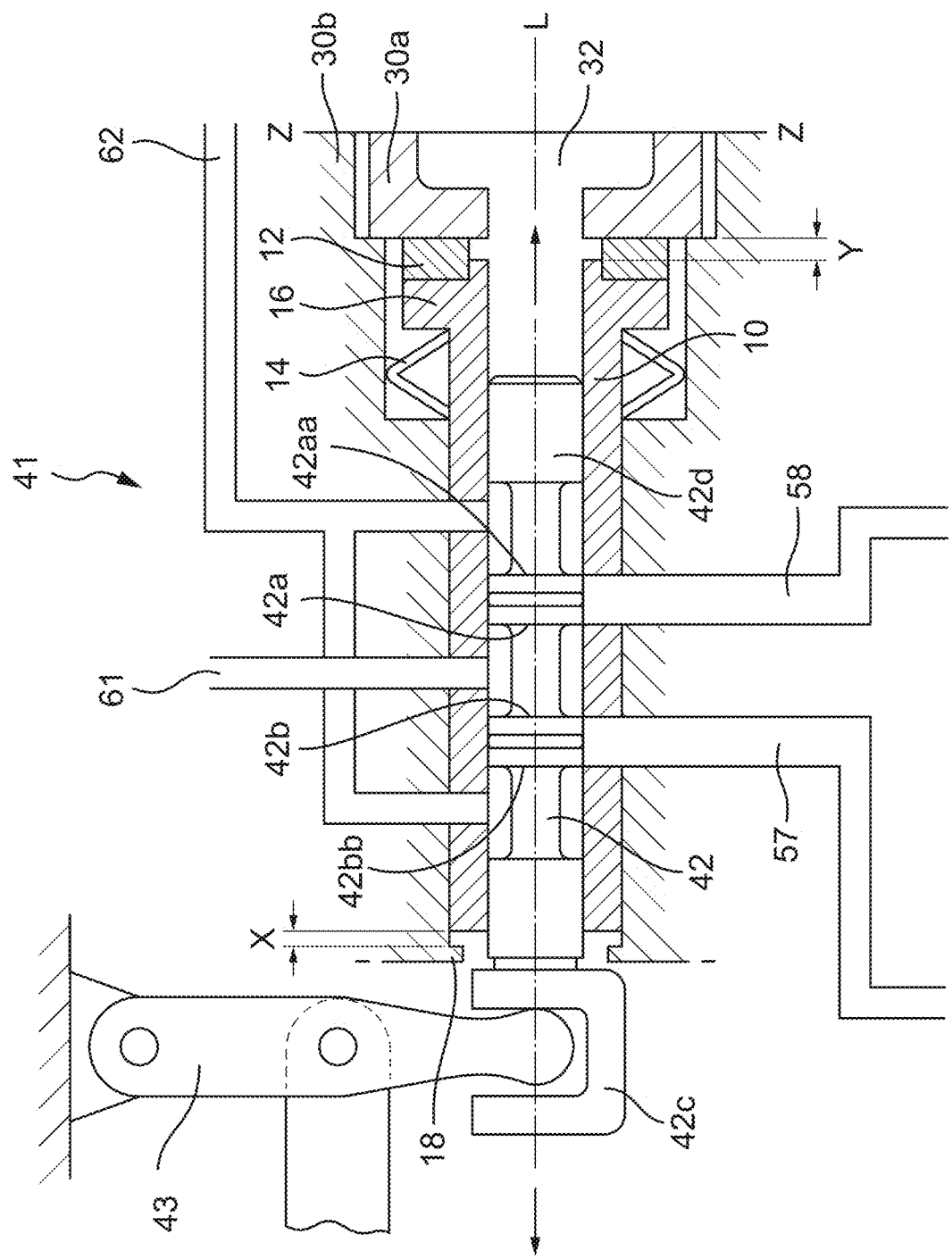

HYDRAULIC VALVE

FOREIGN PRIORITY

This application claims priority to European Patent Application No. 17275089.5 filed Jun. 22, 2017, the entire contents of which is incorporated herein by reference.

TECHNICAL FIELD

This disclosure relates to a hydraulic spool valve assembly (also referred to as a hydraulic servo valve assembly), and a hydraulic actuator featuring the same. This disclosure also relates to a method of compensating for thermal expansion driven force fight in a hydraulic spool valve assembly. Such hydraulic spool valve assemblies are often used in duplex hydraulic systems for redundancy in aerospace applications.

BACKGROUND

Duplex hydraulic systems are used for example in aircraft actuator systems for redundancy and safety so that if one system fails, the other remains operational, allowing continued control of the relevant system. For example the main rotor actuator in a helicopter typically uses a duplex hydraulic control system. Failure modes may include seal failures (leaks), pipe bursts, component structural failure or pump failure. Triplex and even quadruplex systems are also used in some applications.

Hydraulic spool valves in flight control actuators are usually driven by a mechanical lever connected to the pilots input lever which is in turn connected to the pilot's controls by a mechanical linkage. Where duplex hydraulic systems are employed for redundancy and safety reasons, two valves are used, one for each system, driven by a single layshaft and lever assembly. Synchronization of these two valves is critical to avoid potentially damaging 'force fight' between the two hydraulic systems. Force fight is created by the two valves being out of synchronization and this can lead to pressure intensification within the actuator. This intensification can cause premature seal failures and may also cause fatigue damage within the actuator.

Force fight can occur in actuators with tandem cylinder configurations, as shown in FIG. 1. The four chamber pressures within the cylinder need to be precisely controlled so as to minimize the internal forces generated within the tandem piston and cylinder arrangement. These chamber pressures (referred to as base pressures) are controlled by very small spool displacements (around 0.001 inch or 25.4 µm) and therefore any small amount of deviation in the valve synchronization between the two hydraulic systems can result in damaging force fights.

There are several factors affecting valve synchronization including backlash due to manufacturing tolerances and thermal expansion effects acting on the actuator assembly during operation. Whilst the backlash effects can be controlled by manufacturing to tight tolerances or as disclosed in EP 3,128,216 or EP 17275076.2 this does not address valve synchronization errors due to thermal expansion effects.

The present disclosure is focused on providing a hydraulic spool valve assembly that compensates for the aforementioned thermal expansion effects.

SUMMARY

From a first aspect, the present disclosure relates to a hydraulic spool valve assembly in accordance with claim 1.

The movement of the sleeve in the second longitudinal direction may be due to the increase in temperature causing thermal expansion of the housing and/or sleeve.

In one embodiment of the above hydraulic spool valve assembly, the temperature compensation device is disposed between the sleeve and the housing. The temperature compensation device may be in direct or indirect contact with the sleeve and/or the housing.

In another embodiment of any of the above hydraulic spool valve assemblies, the sleeve surrounds at least a portion of the hydraulic spool valve, such as the second end of the hydraulic spool valve.

In another embodiment of any of the above hydraulic spool valve assemblies, the temperature compensation device is a shape memory device. The shape memory device may comprise a shape memory alloy, for example, Nitinol. Alternatively, the temperature compensation device is a bimetallic device. In either of the above, the temperature compensation device may be annular.

In another embodiment of any of the above hydraulic spool valve assemblies, the hydraulic spool valve assembly further comprises a biasing member in operative communication with the sleeve and the housing, and configured to exert a biasing force on the sleeve that opposes movement of the sleeve in the first longitudinal direction. The biasing member may be a spring, for example, a Belleville spring.

In one embodiment of the above hydraulic spool valve assembly, the biasing member is disposed between the sleeve and the housing.

The biasing member may be in direct or indirect contact with the sleeve and/or the housing.

In another embodiment of the previous two hydraulic spool valve assemblies, the sleeve further comprises a flange, and the biasing member and the temperature compensation device engage opposite surfaces of the flange. The flange may be annular and may extend radially from the sleeve.

In another embodiment of any of the above hydraulic spool valve assemblies, the housing further comprises a stop configured to limit the extent of movement of the sleeve in the first longitudinal direction. The stop may be annular and extend radially from the sleeve.

In another embodiment of any of the above hydraulic spool valve assemblies, the hydraulic spool valve assembly comprises two or more hydraulic spool valves operatively connected to a respective drive lever at respective first ends, each respective drive lever being operatively connected to a common input lever, such that movement of the common input lever causes actuation of each respective drive lever and the two or more hydraulic spool valves to move parallel to the longitudinal axis.

In another embodiment of any of the above hydraulic spool valve assemblies, the temperature compensating device allows fluid supply and return lines passing through the housing and the sleeve to remain substantially static with respect to the spool valve during operation of the assembly.

From a second aspect, the present disclosure relates to a hydraulic actuator.

From a third aspect, the present disclosure relates to a method of compensating for thermal expansion driven force fight in a hydraulic spool valve assembly.

The hydraulic spool valve assembly may be as described above in any embodiment.

The movement of the sleeve in the second longitudinal direction may be due to the increase in temperature causing thermal expansion of the housing and/or sleeve.

In one embodiment of the above method, the biasing member is disposed between the sleeve and the housing.

In another embodiment of any of the above methods, the method further comprises placing a biasing member in operative communication with the sleeve and housing, such that the biasing member exerts a biasing force on the sleeve that opposes movement of the sleeve in the first longitudinal direction.

In another embodiment of any of the above methods, the method further comprises limiting the extent of sleeve movement in the first longitudinal direction using a stop.

BRIEF DESCRIPTION OF DRAWINGS

One or more non-limiting examples will now be described, by way of example only, and with reference to the accompanying figures in which:

FIG. 3 illustrates an enlarged view of an exemplary hydraulic spool valve assembly of the duplex hydraulic actuator of FIG. 2.

DETAILED DESCRIPTION

Figure 1:
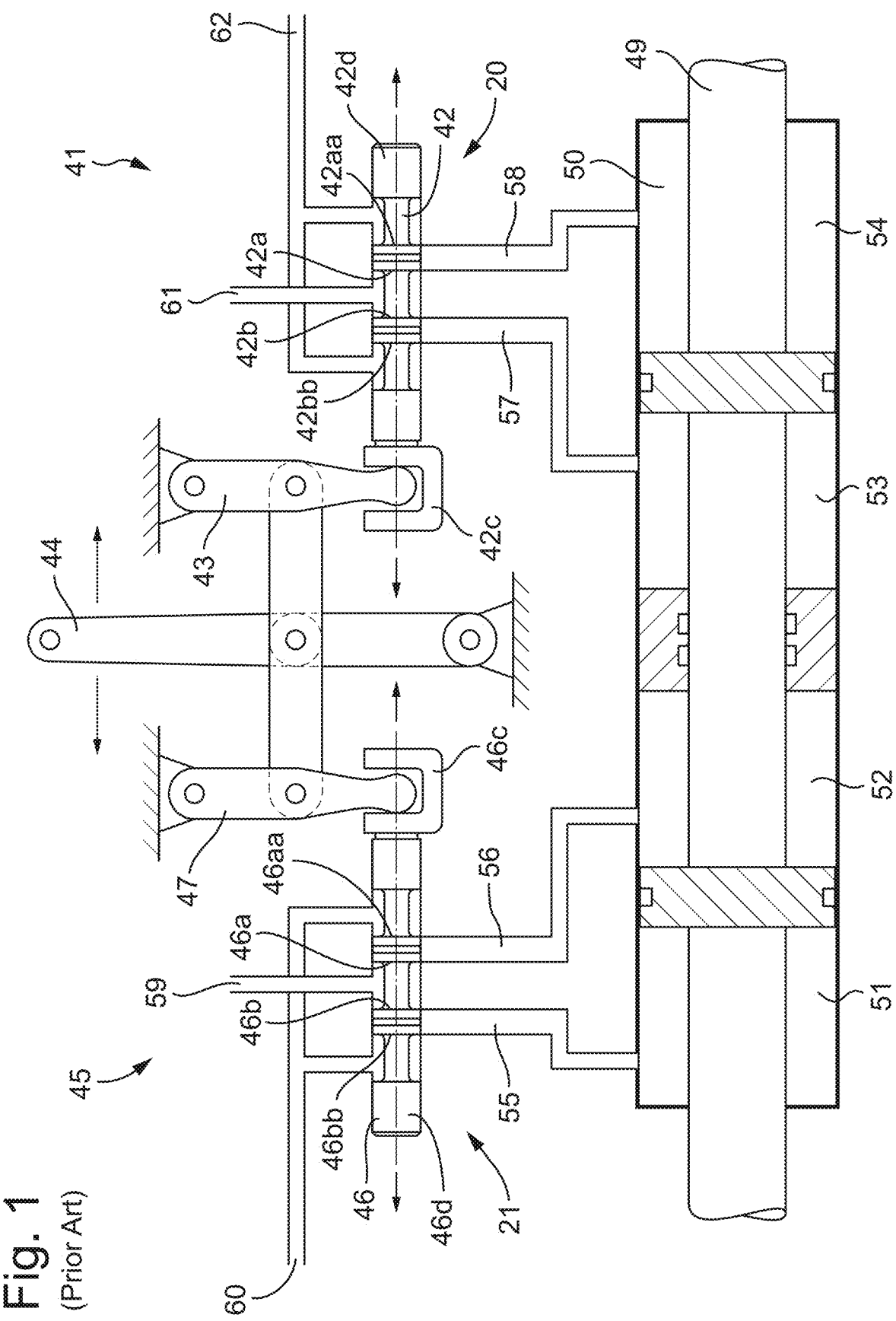
FIG. 1 schematically shows a prior art duplex hydraulic actuator.

FIG. 1 schematically shows a duplex hydraulic actuator system with a first hydraulic system 41 and a second hydraulic system 45. First hydraulic system 41 has a first hydraulic spool valve 42 which is operatively connected to a first drive lever 43 at first end 42c, and is actuated via first drive lever 43 by common input lever 44. Second hydraulic system 45 has a second hydraulic spool valve 46 which is operatively connected to a second drive lever 47 at first end 46c, and is actuated via second drive lever 47 by common input lever 44. Hydraulic spool valves 42, 46 comprise second ends 42d, 46d which are moveably housed within a housing 20, 21 through which lines 55, 56, 57, 58, 59, 60, 61, 62 pass. Each hydraulic spool valve 42, 46 has a plurality of metering surfaces 42a, 42aa, 42b, 42bb, 46a, 46aa, 46b, 46bb which are used to allow or prevent communication of hydraulic fluid across valves 42, 46, as discussed below.

Hydraulic cylinder 50 houses piston 49. Four fluid chambers are formed between the piston 49 and the cylinder 50, namely first fluid chamber 51, second fluid chamber 52, third fluid chamber 53 and fourth fluid chamber 54.

When (the upper end of) common input lever 44 is moved to the right along the axial direction (in the figure), the two hydraulic spool valves 42, 46 and metering surfaces 42a, 42aa, 42b, 42bb, 46a, 46aa, 46b, 46bb are moved to the right. The movement of the metering surface 42a connects pressure line 61 to line 58, allowing hydraulic fluid to flow into fourth chamber 54. At the same time, line 57 is connected to return line 62 via metering surface 42bb allowing hydraulic fluid to flow out of third chamber 53. Simultaneously, movement of the metering surface 46a connects pressure line 59 to line 56, causing hydraulic fluid to flow into second chamber 52. At the same time, line 55 is connected to return line 60 via metering surface 46bb allowing hydraulic fluid to flow out of first chamber 51. Piston 49 is therefore caused to move to the left.

When (the upper end of) common input lever 44 is moved to the left along the axial direction (in the figure), the two hydraulic spool valves 42, 46 and metering surfaces 42a, 42aa, 42b, 42bb, 46a, 46aa, 46b, 46bb are moved to the left. The movement of the metering surface 42b thus connects pressure line 61 to line 57, causing hydraulic fluid to flow into third chamber 53. At the same time, line 58 is connected to return line 62 via metering surface 46bb allowing hydraulic fluid to flow out of fourth chamber 54. Simultaneously, movement of the metering surface 46b connects pressure line 59 to line 55, causing hydraulic fluid to flow into first chamber 51. At the same time, line 56 is connected to return line 60 via metering surface 46aa allowing hydraulic fluid to flow out of second chamber 51. Piston 49 is therefore caused to move to the right.

As the actuator system heats up during operation (e.g. due to the oil temperature rising and/or the temperature of the environment around the actuator system rising) the valve housing 20, 21 will expand due to thermal expansion. The hydraulic spool valves 42, 46 are fixed to the drive levers 43, 47 and not secured to the valve housing 20, 21, and so do not necessarily expand by the same amount or in the same manner as that of the housing 20, 21. This differential thermal expansion can cause some or all of the metering surfaces 42a, 42aa, 42b, 42bb, 46a, 46aa, 46b, 46bb to be become misaligned with lines 55, 56, 57, 58 and permit unintended communication of hydraulic fluid to the chambers 51, 52, 53, 54, which can generate unintended movement of piston 49 and cause force fight within the actuator system. Such force fight can be worsened, when the valve housing 20, 21 is made of a "lighter" alloy (e.g. Aluminum alloy), since such an alloy typically provides a larger coefficient of thermal expansion than "heavier" alloys (e.g. steel).

Valve housings 20, 21 may be made from a "lighter" alloy with the inclusion of a suitable spool sleeve 10, 11, where the sleeve 10, 11 is rigidly fixed to the housing 20, 21, such as described in relation to the embodiments of the present disclosure.

Figure 2:
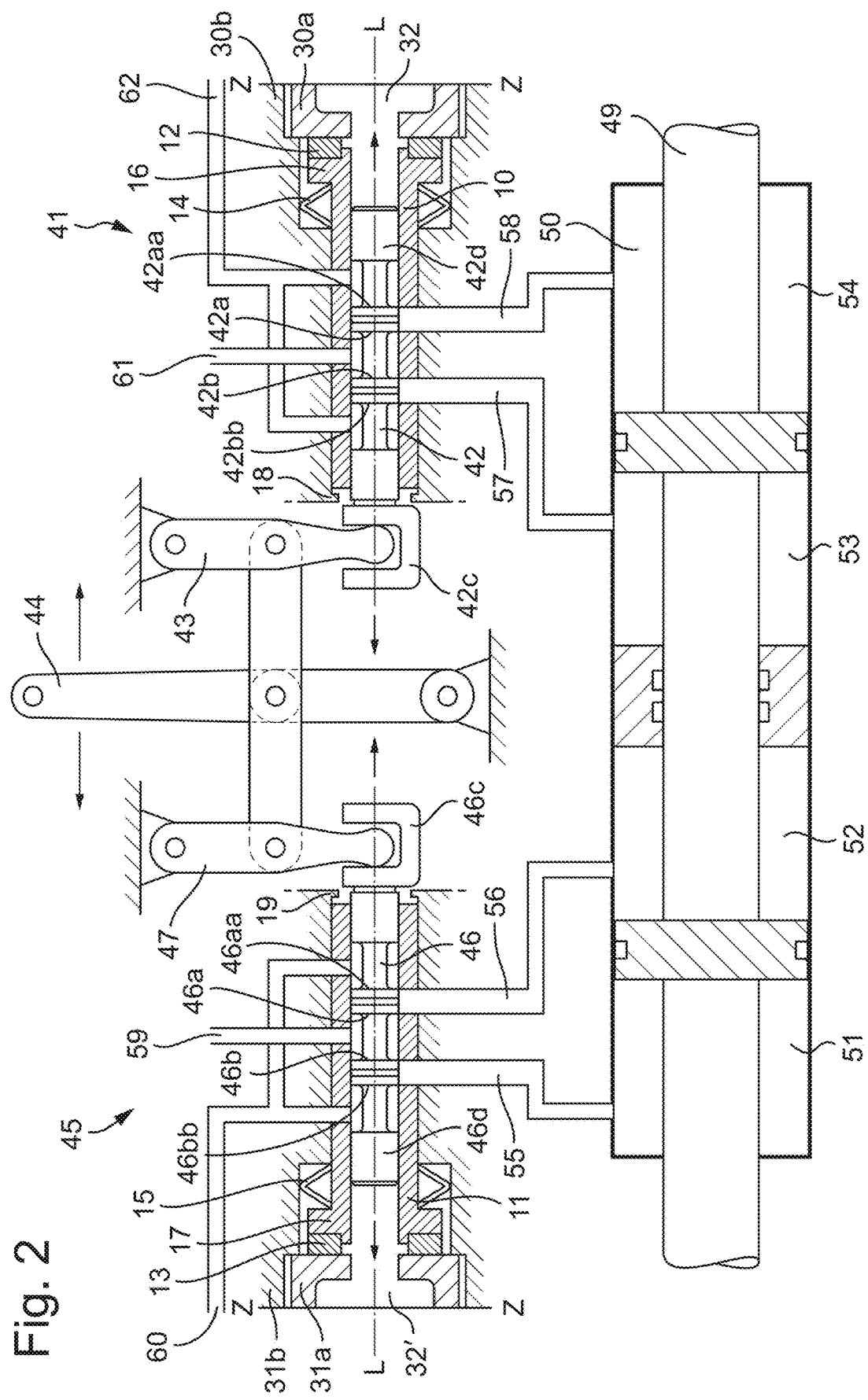
FIG. 2 illustrates a cross-sectional view of an exemplary duplex hydraulic actuator in accordance with this disclosure.

FIG. 2 schematically illustrates a cross-sectional view of a duplex hydraulic actuator system in accordance with an embodiment of the present disclosure. Like components have been given the same reference numerals, and operate as described in relation to FIG. 1.

In contrast to the duplex hydraulic actuator system of FIG. 1, each of the hydraulic systems 41, 45 comprise a housing 30a, 30b, 31a, 31b which defines a bore 32 having a longitudinal axis L, and a sleeve 10, 11 disposed within the bore 32.

The second ends 42d, 46d of the hydraulic spool valves 42, 46 are surrounded by sleeves 10, 11 and are disposed within the bore 32. The spools 42, 46 move relative to the sleeve 10, 11 in response to actuation of the valves 42, 46 to move the piston 49, as described in relation to FIG. 1. Housing 30a, 30b, 31a, 31b acts in the same manner as the valve housing 20, 21 described in relation to FIG. 1, and extends past section line Z to contact an actuator housing (not shown) i.e. a static structure. Lines 55 to 62 extend through sleeves 10, 11 to allow fluid communication between them, the spool valves 42, 46 and the piston 49 and chamber 50, to allow operation of the actuator system as described in relation to FIG. 1.

The sleeves 10, 11 comprise annular flanges 16, 17 that are each in contact with a temperature compensation device 12, 13 and a biasing member 14, 15 on opposite surfaces on the flanges 16, 17. Temperature compensating devices 12, 13 are disposed between respective flanges 16, 17 and housing portions 30a, 31a and engage the same. Biasing members 14, 15 are disposed between respective flanges 16, 17 and housing portions 30b, 31b and engage the same.

When the actuator system heats up during operation, thermal expansion of the housing 30a, 30b, 31a, 31b in the longitudinal direction will cause the abutting sleeves 10, 11 to move in the same longitudinal direction, for instance, when looking at FIG. 2, sleeve 10 will move right parallel to the longitudinal axis L and sleeve 11 will move left parallel to the longitudinal axis L, i.e. both sleeves will move away from their respective drive levers 43, 47.

The temperature compensating devices 12, 13 are configured to expand in at least the longitudinal direction in response to the temperature increase, to oppose the movement of the sleeves 10, 11 due to thermal expansion of the housing 30a, 30b, 31a, 31b in the longitudinal direction. In other words, when looking at FIG. 2, temperature compensating device 12 will expand left parallel to longitudinal axis L and temperature compensating device 13 will expand right parallel to longitudinal axis L i.e. towards their respective drive levers 43, 47. In this manner, the temperature compensating devices 12, 13 allow lines 55, 56, 57, 58 to remain substantially static with respect to the spool valves 42, 46 (at any particular position of drive lever arms 43, 47). This results in the lines 55, 56, 57, 58 remaining properly aligned with metering surfaces 42a, 42aa, 42b, 42bb, 46a, 46aa, 46b, 46bb to prevent unintended fluid communication to the piston 49 and chamber 50 as the actuator system heats up during operation. This compensates for the thermal expansion effects described with respect to FIG. 1, thus preventing force fight being caused thereby.

In the depicted embodiment, the temperature compensating devices 12, 13 are annular shape memory devices, comprising a shape memory alloy, such as Nitinol. However, any shape memory device and/or shape memory alloy that provides reversible expansion with a temperature increase can be used within the scope of this disclosure. Alternatively, a bimetallic device, for instance, a bimetallic disc could be used. The degree of expansion of the shape memory device with temperature increase can be varied, as is well known in the art, to match the dimensions and expansion characteristics of any specific hydraulic actuator system.

Biasing members 14, 15 are configured to exert a biasing force on the sleeves 10, 11 that opposes the longitudinal movement provided by the temperature compensating devices 12, 13. This biasing force can be used to meter the amount of sleeve movement in response to temperature compensating device expansion over a given temperature range.

In the event of failure of the temperature compensating devices 12, 13, the biasing force will also act to engage sleeves 10, 11 against housing portions 30a, 31a. Although this provides a backlash Y, it will stabilize the sleeves 10, 11 against the housing portions 30a, 31a such that the spool valves 42, 46 do not fail completely due to failure of the temperature compensating devices 12, 13.

As can be seen in more detail from FIG. 3, the housing portions 30b, 31b further comprise annular stops 18, 19 that limit longitudinal movement of the sleeves 10, 11 in the direction of longitudinal movement provided by the temperature compensating devices 12, 13.

In the event of a failure of the biasing members 14, 15, sleeves 10, 11 move longitudinally within backlash X, however, will engage and stabilize against stops 18, 19, such that the spool valves 42, 46 do not fail completely due to failure of the biasing members 14, 15.

In the depicted embodiment, the biasing members 14, 15 are Belleville springs, however, any biasing member that can provide a suitable biasing force may be used within the scope of this disclosure.

The invention claimed is:

1. A hydraulic spool valve assembly, comprising:
a housing defining a bore having a longitudinal axis (L);
a hydraulic spool valve having a first end for connection to a drive arm, and an opposing second end disposed within the bore;
a sleeve disposed within the bore between the hydraulic spool valve and the housing; and
a temperature compensation device in operative connection with the sleeve and the housing, the temperature compensation device configured to expand in a first longitudinal direction in response to a temperature increase, to oppose movement of the sleeve in an opposing second longitudinal direction, wherein the temperature compensation device includes a shape memory alloy or a bimetallic device.

2. The hydraulic spool valve assembly of claim 1, wherein when temperature compensation includes the shape memory alloy, the shape memory alloy is Nitinol.

3. The hydraulic spool valve assembly of claim 1, wherein the temperature compensation device is annular.

4. The hydraulic spool valve assembly of claim 1, further comprising a biasing member in operative communication with the sleeve and the housing, and configured to exert a biasing force on the sleeve that opposes movement of the sleeve in the first longitudinal direction.

5. The hydraulic spool valve assembly of claim 4, wherein the sleeve further comprises a flange, and the biasing member and the temperature compensation device engage opposite surfaces of the flange.

6. The hydraulic spool valve assembly of claim 4, wherein the biasing member is a spring.

7. The hydraulic spool valve assembly of claim 6, wherein the biasing member is a Belleville spring.

8. The hydraulic spool valve assembly of claim 1, wherein the housing further comprises a stop configured to limit the extent of movement of the sleeve in the first longitudinal direction.

9. The hydraulic spool valve assembly of claim 1, further comprising:
two or more hydraulic spool valves operatively connected to a respective drive lever at respective first ends, each respective drive lever being operatively connected to a common input lever, such that movement of the common input lever causes actuation of each respective drive lever and the two or more hydraulic spool valves to move parallel to the longitudinal axis (L).

10. A hydraulic actuator comprising:
the hydraulic spool valve assembly of claim 1;
a hydraulic cylinder; and
a piston, wherein the piston is housed within the hydraulic cylinder, wherein the one or more hydraulic spool valves are in fluid communication with the hydraulic cylinder and piston such that movement of the one or more hydraulic spool valves causes fluid to enter and/or exit the hydraulic cylinder causing the piston to move.

\* \* \* \* \*